United States Patent
Gentric et al.

(10) Patent No.: US 7,483,489 B2
(45) Date of Patent: Jan. 27, 2009

(54) STREAMING MULTIMEDIA DATA OVER A NETWORK HAVING A VARIABLE BANDWITH

(75) Inventors: Philippe Gentric, Fourqueux (FR); Yves Ramanzin, Paris (FR)

(73) Assignee: NXP B.V., Eindhoven (NL)

( * ) Notice: Subject to any disclaimer, the term of this patent is extended or adjusted under 35 U.S.C. 154(b) by 798 days.

(21) Appl. No.: 10/502,729

(22) PCT Filed: Jan. 27, 2003

(86) PCT No.: PCT/IB03/00259

§ 371 (c)(1), (2), (4) Date: Jul. 27, 2004

(87) PCT Pub. No.: WO03/065683

PCT Pub. Date: Aug. 7, 2003

(65) Prior Publication Data

US 2005/0135476 A1 Jun. 23, 2005

(30) Foreign Application Priority Data

Jan. 30, 2002 (EP) .................. 02290209

(51) Int. Cl.
*H04N 7/12* (2006.01)
(52) U.S. Cl. ................ 375/240.26
(58) Field of Classification Search ........... 375/240.01, 375/240.12, 240.26; *H04N 7/12*
See application file for complete search history.

(56) References Cited

U.S. PATENT DOCUMENTS 6,501,797 B1 * 12/2002 van der Schaar et al. ............ 375/240.12

OTHER PUBLICATIONS

MPEP-4 Specifications.

* cited by examiner

*Primary Examiner*—Young Lee

(57) ABSTRACT

Groups of streams of encoded data having different predetermined bit rates are selected for transmission to a client application based on available bandwidth. Common values for at least a part of the decoding parameters are determined so that the decoder can use the same decoding parameter values for decoding stream elements within each group of streams of various bit rates.

10 Claims, 4 Drawing Sheets

STREAMING MULTIMEDIA DATA OVER A NETWORK HAVING A VARIABLE BANDWITH

FIELD OF THE INVENTION

The invention relates to multimedia transmissions. More particularly, it relates to a method of streaming multimedia data over a network having a variable bandwidth, the method comprising the steps of encoding data coming from a multimedia source and supplying a set of encoded stream formed with stream elements containing encoded multimedia data, the encoded streams having various predetermined bit rates associated with specific decoding parameter values to be transmitted, via a server, to a client application decoder for enabling the client decoder to decode the stream elements with respect to their specific decoding parameter values.

The invention also relates to an encoder and a server, and to a transmitter comprising such an encoder and server.

It also relates to a computer program product for carrying out the method mentioned above and to a signal for carrying such a computer program.

The invention applies to systems of multimedia streaming over networks whose effective instantaneous bandwidth may vary with time. More particularly, it applies to video transmissions over mobile telephony systems using MPEG-4 audio and Visual (Moving Picture Expert Group-4) standards.

BACKGROUND ART

Mobile networks such as the GPRS (General Packet Radio System) or UMTS Universal Mobile Telephony System) and the Internet generally do not provide a guaranteed quality of service. The effective instantaneous bandwidth varies with time because of congestions, transmission errors or resource sharing, for instance. In the framework of multimedia streaming over such networks, servers must provide adaptation mechanisms to these variations in order to minimize data losses on the one side and to maximize the quality of the content received by the client on the other side. A classical approach of this problem is known as "Stream Switching". The same content is encoded by a media encoder into several streams at several bit rates. With respect to the currently available bandwidth, an adequate stream, i.e. having an adequate bit rate with respect to the available bandwidth, is selected to be transmitted to the client via a media server, which operates the corresponding stream switching, for selecting said adequate stream to be sent.

OBJECT AND SUMMARY OF THE INVENTION

It is an object of the invention to provide an encoding method, in the framework of multimedia streaming, which yields a better quality of service for the end user.

The invention takes the following aspects into consideration. Media encoders encode streams having predetermined bit rates, to be supplied, via a media server, to a client application. The encoder uses encoding information selected with respect to the content and the targeted bit rates of the streams. This information is selected in order to optimize the quality of the content received at the other end of the transmission system by the client application decoder. The information must be communicated to the client application decoder for the decoder to be correctly configured, in order to be able to correctly decode the encoded streams with respect to their contents and bit rates. Therefore, each stream has its own decoder configuration. Thus, when a server switches from one stream to another, e.g. in order to adapt the bit rate of the supplied stream to the available bandwidth of the network, a new decoder configuration corresponding to the new supplied stream has to be sent to the client decoder. The decoder is then re-initialized with the new decoder configuration. The stream switching is therefore not seamless for the client and may affect the service quality from the end user's point of view.

To remedy this drawback, the invention proposes a method, such as mentioned in the opening paragraph, wherein the encoding step comprises a preliminary step of determining common values for at least a part of the decoding parameters suitable for at least a group of streams within the set of encoded streams, so that the decoder can use the same decoding parameter values for decoding all stream elements from all streams within said group of streams, and a step of building said group of streams, to which common decoding parameter values are assigned.

According to the invention, several streams forming a group and corresponding to the same multimedia content are encoded at several bit rates in order that all streams within the group correspond to the same decoder configuration. This enables the decoder to switch from one stream to another within the same group, without re-initializing its decoding parameters.

BRIEF DESCRIPTION OF THE DRAWINGS

The invention and additional features, which may be optionally used to implement the invention to advantage, are apparent from and will be elucidated with reference to the drawings described hereinafter, wherein.

DETAILED DESCRIPTION OF THE DRAWINGS

The following remarks relate to reference signs. Like entities are denoted by like letter references in all Figures.

Figure 1:
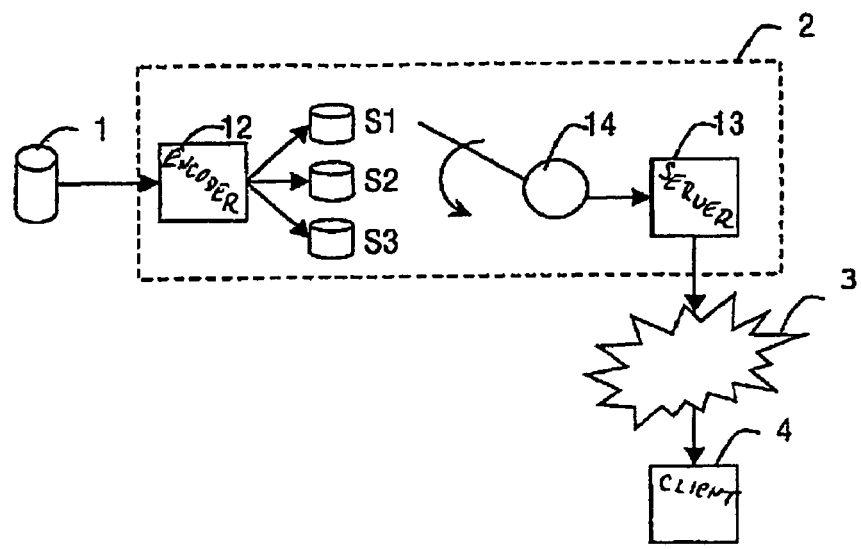
FIG. 1 is a block diagram for illustrating a system and a transmitter comprising a server and a decoder according to the invention, FIG. 2 schematically illustrates the mechanism of stream switching within a media server according to the invention.

FIG. 1 illustrates basic features of a multimedia streaming system according to the invention. The system comprises a multimedia source 1, a transmitter 2, a network 3, such as a mobile radiotelephony network or the Internet, and a receiver 4. The transmitter comprises a media encoder 12 and a media server 13. The media encoder 12 receives multimedia data from the multimedia source 1 and produces a set of encoded streams, denoted S1, S2 and S3, formed with successive stream elements containing said multimedia data. For a given multimedia source, all produced encoded streams within the set {S1, S2, S3} comprise the same multimedia content but have different predetermined bit rates, denoted R1, R2 and R3, respectively. The bit rates are predetermined to enable the system to provide the receiver's client application with a set of various qualities of services, selected, on the one hand, with respect to the nature of the transmitted content, each content (audio, fixed images, video, etc.) requiring a specific available bandwidth, and, on the other hand, with respect to the quality of service required by the user of the client application (the end user). The various available bit rates are also useful to enable the system to cope with variations of the available bandwidth, which often cause a reduction of the bit rate of the transmitted streams. As a matter of fact, the network's effective available bandwidth may vary with time, with respect to several parameters. These parameters include current traffic and radio transmission conditions, which may considerably affect the currently available bandwidth. With respect to this currently available bandwidth and the required quality of service, the adequate stream will be supplied to the receiver 4, by stream switching means 14 via the media server 13.

FIG. 1 illustrates a system which uses files: the media to be encoded is contained in a file and the encoded bit streams are stored in a file. Nevertheless, the principle is also valid in a real-time context: the media source 1 may be a live source (e.g. a camera) and the server 13 can directly broadcast one of the outputs of the encoder 12.

Figure 2:
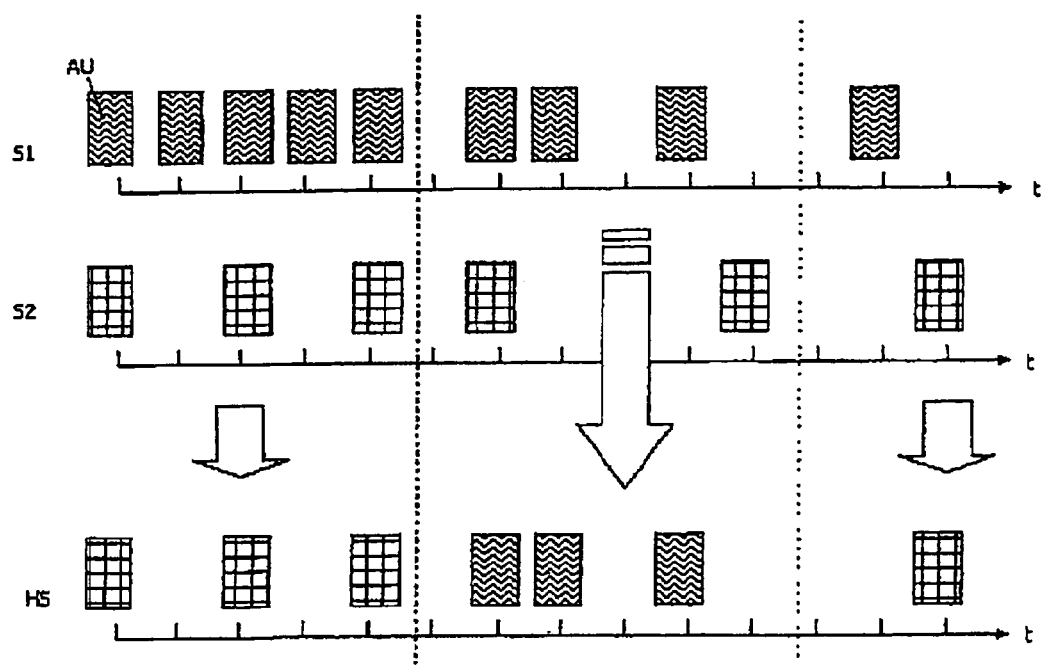

FIG. 2 illustrates a hybrid encoded stream, denoted HS, produced by the encoder 12 of FIG. 1 from two different encoded streams, denoted S1 and S2. According to the invention, the hybrid stream HS is built up by using the stream switching means 14. Each encoded stream S1 and S2 is encoded by using specific encoding parameters, which are selected with respect to several factors, including the bit rate, and correspond to specific decoding parameter values. Therefore, the decoding parameter values resulting from the selected encoding parameter values have to be transmitted to the receiver to enable the receiver to properly decode the content of the received streams. The encoded streams are formed with stream elements, called Access Units (AU), to which time stamps indicating the place of the Access Units within a transmitted stream are associated. According to the invention, common decoding parameters are assigned to all encoded streams within a group of streams selected among the set of encoded streams, to enable the receiver's decoder to be initialized in the same way for all the streams of the group. Therefore, the decoder does not have to be reconfigured whenever the server would switch from the stream S1 to another stream S2 within the same group of streams. The switching mechanism is thus simplified, and avoids several reconfigurations of the decoder's parameters. The resulting new hybrid stream HS is composed of stream elements or Access Units from both streams S1 and S2. Therefore, the bit rate varies from the bit rate of S1 to the bit rate of S2. Since the decoding parameters of all stream elements are the same, the stream switching has no impact on the decoder's configuration.

From characteristics of the media source 1 (e.g size and frame rate in case of video) and user settings (required bit rate of the stream to be supplied to the end user), the encoder 12 determines the common decoder configuration (decoding parameters) suitable for several streams having different predetermined bit rates and forming a group of streams. Then, the encoder encodes each stream at the targeted bit rate, using the common previously determined decoder configuration.

Figure 3:
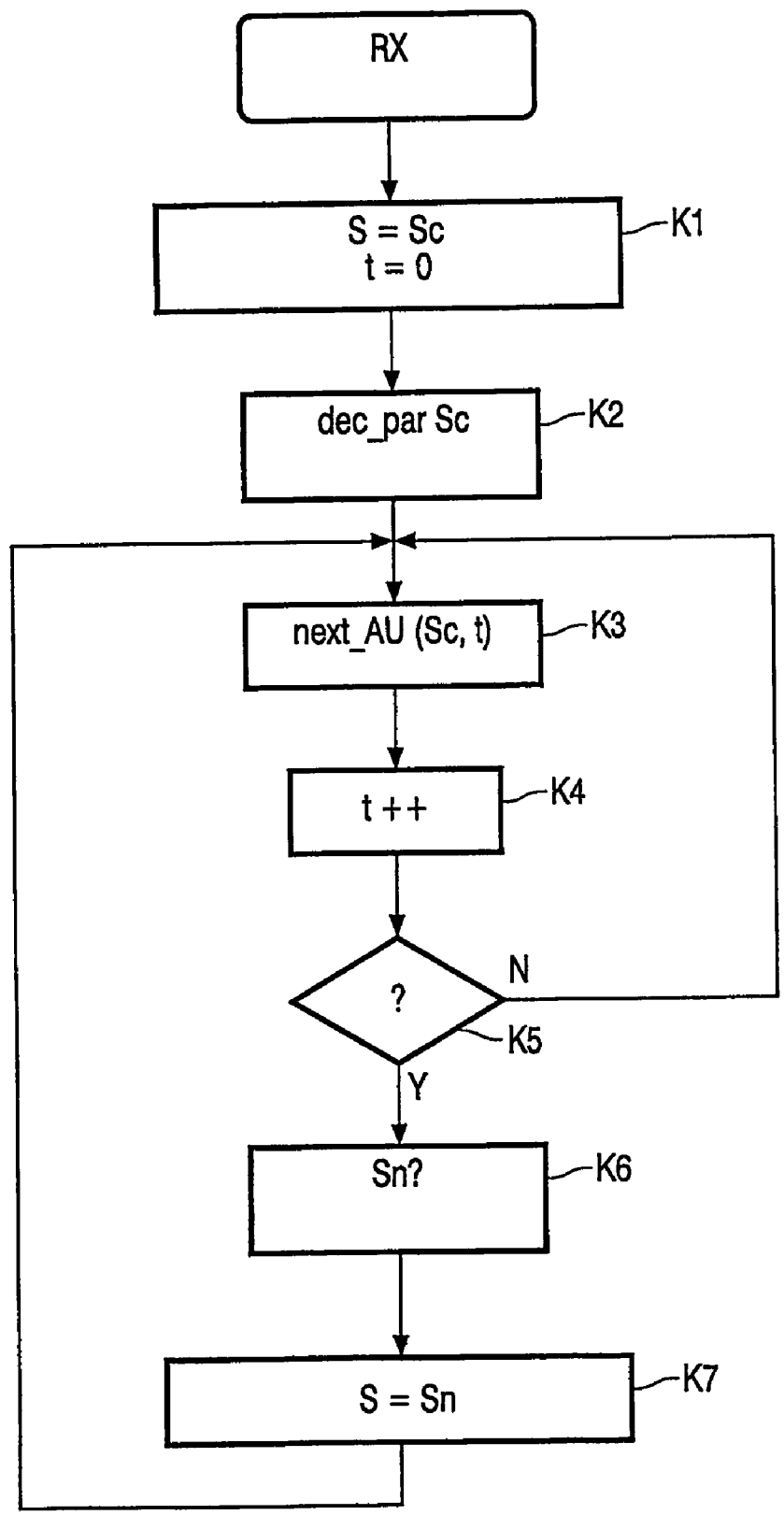
FIG. 3 is a diagram for illustrating an encoding method according to the invention.

FIG. 3 illustrates an algorithm of switching streams in an encoding method according to the invention, enabling the hybrid stream HS of FIG. 2 to be generated. The algorithm comprises the following steps:

K0: reception of the client's request (RX),
K1: initialization of the stream switching means with the current transmitted stream (S=Sc) and position of an index t to zero (t=0),
K2: transmission of the decoder's configuration with respect to the current stream (dec_par Sc),
K3: transmission of the next Access Unit of the current stream (next_LAU(Sc,t)),
K4: incrementation of variable t (t++),
K5: checking if there is a need to switch to another stream, with respect to the current bandwidth conditions (?), if the answer is yes (Y) go to K6, if the answer is no (N), go back to K3,
K6: determination of a new stream (Sn?) complying with the new bandwidth conditions,
K7: update of the current stream to the new stream (S=Sn) and go back to K3.

Figure 4:
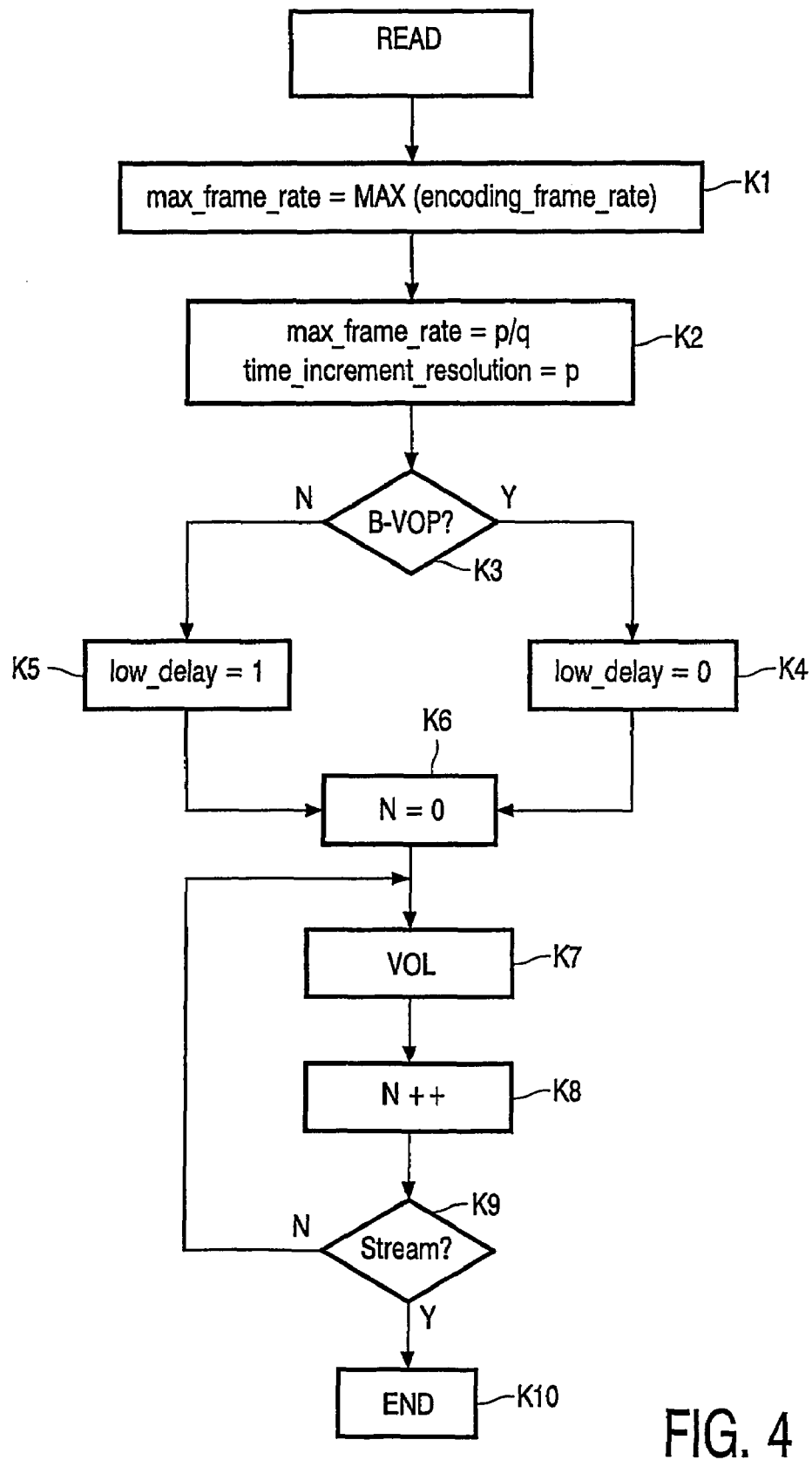
FIG. 4 is a diagram for illustrating an example of an encoding method according to a first embodiment of the invention, FIG. 5 schematically illustrates an example of a video stream produced by an encoding method according to a preferred embodiment of the invention.

FIG. 4 illustrates an example of an encoding method in a particular embodiment of the invention suitable for an MPEG-4 video transmission system. This embodiment relates to transmission of video content whose data are coded in the MPEG-4 format, according to the recommendation ISO/IEC 14496-2:2001.

An MPEG-4 video stream is a succession of Access Units, containing Video Object Planes standing for video images, denoted VOPs. There are 3 kinds of VOPs: Intra, denoted I or I-VOP, Predictive, denoted P or P-VOP and Bi-directional, denoted B or B-VOP. An I-VOP is a self-contained frame. This means that all the encoding elements of an I-VOP are contained in the current I-VOP frame. A P-VOP is encoded using information from the previous frame. The decoding of a P-VOP requires information from the previous VOP of the stream in display order. A B-VOP is like a P-VOP but in both backward and forward directions. A B-VOP is coded and decoded using information from the previous and the next frame or plane in display order. Each kind of VOP has specific coding and decoding properties which, among others, affect the bit rate. Therefore, they have specific decoding parameters, which are transmitted at the beginning of a new video stream within a predetermined Access Unit, called Video Object Layer header, denoted VOL.

The decoding parameters include a "low_delay" parameter and a "time_increment_resolution" parameter. The "low_delay" parameter indicates the use of B-VOPs in the stream. The "time_increment_resolution" parameter indicates the time scale suitable for the stream, taking into account all time stamps of the transmitted Access Units. According to the invention, the encoder, knowing predetermined encoding parameters assigned to each stream, including user settings, selects a group of streams, which are able to have common decoding parameters and determines the values of said common parameters. In the example illustrated in FIG. 4, said common parameters, to which common values are assigned, are the "low_delay" parameter and the "time_increment_resolution" parameter. The encoder determines a common time scale suitable for all the streams within the selected group and determines whether B-VOPs are to be used in this group.

For example, the encoder encodes all streams using the smallest time scale of the group, and sets the "low_delay" parameter value to the maximum in order to indicate that B-VOPs are to be used if at least one stream may use them, within the predetermined group of streams having common decoding parameters. According to the invention, decoding parameters of the streams are controlled in order to be valid for at least several streams among all available streams, preventing the decoder, at the other end of the transmission chain, from having to frequently change its configuration to be able to decode the received streams.

This advantageously enables the end user to watch a video on his mobile phone at a varying bit rate, without suffering too much from these bit rate variations. Stream switches do not cause the decoder to stop during the video display because the decoding parameters need not be updated after a stream switch. The decoding parameters are especially selected to remain valid from one stream to another. Variations in the available bandwidth due to e.g. a change in radio transmission or traffic conditions, will cause no major disturbances for the end user. Actually, the end user would probably be aware of a stream switch because the quality of the video images he receives, e.g. on his mobile phone, would be affected by such a stream switch, but the video would not be stopped.

FIG. 4 shows an example of an encoding method, according to a simple embodiment of the invention where the same common decoding parameter values are assigned to all streams (the group equals the whole set of encoded streams). The method comprises the following steps:

K0: read the user encoding parameters for all streams to be encoded (READ),

K1: set a maximum frame rate parameter value to a value corresponding to the maximum bit rate of all frames to be encoded (max_frame_rate=MAX(encoding_frame_rate)), K2: compute the minimum value of an integer, denoted p, such as the maximum frame rate parameter value equals p/q, where q is also an integer, (max_frame_rate=p/q) and set a time resolution increment to p (time_increment_resolution=p), K3: check if at least one stream uses B_VOP (B-VOP ?), if yes (Y) go to step K4, if no (N) go to step K5, K4: set the low_delay parameter to zero (low_delay=0), K5: set the low_delay parameter to 1 (low_delay=1), K6: set a variable index N to zero (N=0), K7: encode stream index N enforcing the values of the time_increment_resolution and low_delay fields of the VOL header with the values set in step K2, K4 and K5 (VOL), K8: increment N (N++), K9: check whether all streams are encoded (Stream ?), if yes (Y) go to step K10, if no (N) go back to step K7, K10: end of the algorithm.

Figure 5:
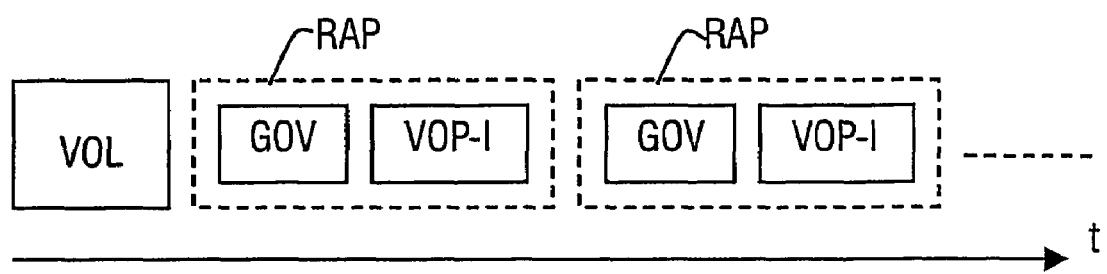

FIG. 5 shows an example of an encoded stream according to a preferred embodiment of the invention. For a given multimedia content, all the alternate streams are encoded in a way that the same decoder configuration parameters can be used at the receiving side. In this way, a change from one stream to another can be seamless from the client's point of view. This embodiment particularly relates to the streaming of Audio/Video where the video format is MPEG-4 video (the audio format may be any streamable format).

When network conditions get really bad, the available bandwidth is no longer large enough to transmit both audio and video streams. In order not to interrupt the service, an acceptable fallback position consists in stopping the transmission of the video stream and continuing with the audio stream only. Since a stream switch does not necessarily cause the decoding parameters to be updated, the server would not automatically signal that the stream has changed. An absence of a video packet can be interpreted by the client decoder as an error condition such as a lost connection or network congestion. This may lead to taking inappropriate measures. Moreover, when network conditions get better so that it becomes possible to transmit both audio and video streams again, the server needs a confirmation that video packets are still expected by the client decoder.

A solution to this problem is to send a predetermined minimal bit rate video stream, denoted MBRVS, together with the audio stream, instead of the expected video stream, whenever the available bandwidth is to be limited for the system to transmit an acceptable video stream. According to the MBRVS solution, some video packets are still sent to the client, but scarcely and with a minimal size. Therefore, the server will operate as if it was still streaming regular Audio and Video streams, but the video stream will no longer require a significant part of the bandwidth. This particularly applies to the stream, which has the lowest bit rate within the set of encoded streams. From the server point of view, there is no difference between this bit stream (which really intends to transmit only encoded audio data) and the other ones (which contain both genuine audio and video data).

Such a minimal bit rate video stream MBRVS is illustrated in FIG. 5. It comprises a first Access Unit VOL for transmitting the common decoding parameters, as described with respect to FIG. 4 and subsequent Access Units VOPs. The second and subsequent Access Units comprise random Access Points according to the MPEG-4 recommendation, denoted RAPs. These RAPs comprise a header of the Group of Video Objects type, denoted GOV, for transmitting an absolute time reference, followed by a frame of the VOP-I type. RAPs allow easy switching from one stream to the other since they transmit the absolute time reference. The second Access Unit of the stream contains e.g. a black or empty fixed image, of the VOP-I type. In this case, the black image corresponds to the simplest encoded video frame. According to this embodiment, the VOP-I fields of the third and subsequent Access Units RAPs are filled in with an instruction, e.g. of the type "VOP_not_coded", which causes the decoder to copy the content of the previous frame, which was the black fixed image in this case. The "VOP_not_coded" signaling needs only a few bits.

Actually, in MPEG-4 visual, a VOP can be indicated as "not coded" in its header. There is no more information coded in the streams for this VOP and the corresponding image is the exact recopy of its past temporal reference. The only thing that is updated is the time stamp of the VOP. Therefore, the MBRVS is built with the previously defined decoder configuration using only "not coded" VOPs. In order to enable an immediate switch to this stream, the coding type of all the VOPs is set to Intra mode VOP-I and a GOV is associated with each VOP (i.e. all VOPs are Random Access Points). The only exception is for the first VOP of the stream. In order to enable a correct decoding by any MPEG-4 compliant decoder, the first VOP is coded as a black VOP.

The drawings and their description hereinbefore illustrate rather than limit the invention. It will be evident that there are numerous alternatives, which fall within the scope of the appended claims.

The invention claimed is:

1. A method of streaming multimedia data over a network having a variable bandwidth, the method comprising:
    encoding data coming from a multimedia source,
    supplying a set of encoded streams formed with stream elements containing encoded multimedia data, each encoded stream being encoded at a different predetermined bit rate,
    determining common values for at least a part of the decoding parameters suitable for at least a group of streams of various predetermined bit rates within the set of encoded streams so that a decoder can use the common decoding parameter values for decoding all stream elements from all streams within the group of streams, and
    building the group of streams to which common decoding parameter values are assigned.

2. A method as claimed in claim 1, wherein
    the decoder is configured according to an MPEG-4 (Moving Picture Expert Group 4) recommendation, and the decoding parameters, to which common values are assigned, include a "low_delay" parameter and a "time_increment_resolution" parameters.

3. A method as claimed in claim 2, wherein
a value corresponding to a highest probability of using B-VOP (Bidirectional Video Object Planes) within the group of encoded streams is assigned to the "low_delay" parameter.

4. A method as claimed in claim 2, wherein
a value corresponding to a smallest time increment resolution needed within the group of encoded streams is assigned to the "time_increment_resolution" parameter.

5. A method as claimed in claim 2, wherein:
the client application decoder is configured according to recommendation ISO 14496-2 MPEG-4 visual,
each encoded stream includes a video encoded stream and an audio encoded stream for separately encoding audio and video data, and
wherein
the video stream is formed with consecutive stream elements called Access Units according to said recommendation, including:
a first Access Unit for transmitting the common decoding parameter values,
a second Access Unit for transmitting a predetermined fixed image of the Intra type according to said recommendation and
a third and subsequent Access Units comprising Random Access Point information for transmitting an absolute time reference and a piece of information of the type: "VOP_not_coded" according to said recommendation, which indicates to the client application decoder to copy the previous Access Unit.

6. A computer program product for an encoder computing a set of instructions which when loaded into the encoder, causes the encoder to carry out the method as claimed in claim 1.

7. A signal for carrying a computer program, the computer program being arranged to carry out the method as claimed in claim 1.

8. An encoding system comprising:
an encoder that is configured to:
encode data coming from a multimedia source, and
provide a set of encoded streams formed with stream elements containing the encoded multimedia data, each encoded stream being encoded at a different predetermined bit rate, and
a switch that is configured to:
determine common values for at least a part of the decoding parameters suitable for at least a group of streams of various predetermined bit rates within the set of encoded streams so that a decoder can use the common decoding parameter values for decoding all stream elements from all streams within the group of streams, and
build the group of streams to which common decoding parameter values are assigned.

9. A server for serving a client application with an encoded stream selected within a set of encoded streams built by a media encoder with stream elements containing encoded data coming from a multimedia source, each encoded stream being encoded at a different predetermined bit rate, wherein the server is configured to:
determine common values for at least a part of the decoding parameters suitable for at least a group of streams of various predetermined bit rates within the set of encoded streams so that a decoder of the client application can use the common decoding parameter values for decoding all stream elements from all streams within the group of streams, and
supply the group of streams to which common decoding parameter values are assigned to the client application.

10. A transmitter for streaming multimedia data over a network having a variable bandwidth, the transmitter comprising:
a media encoder that is configured to:
encode data coming from a multimedia source, and
provide a set of encoded streams formed with stream elements containing encoded multimedia data, each encoded stream being encoded at a different predetermined bit rate,
a switching system that is configured to:
determine common values for at least a part of the decoding parameters suitable for at least a group of streams of various predetermined bit rates within the set of encoded streams so that a decoder can use the common decoding parameter values for decoding all stream elements from all streams within the group of streams, and
build the group of streams, to which common decoding parameter values are assigned, and
a media server that is configured to provide the common values and the group of streams to a client application.

* * * * *